(No Model.)

D. N. SIMONS.
PLANT PROTECTOR.

No. 598,821. Patented Feb. 8, 1898.

Witnesses
Harry L. Amer
Victor J. Evans

Inventor
David N. Simons.
By John Wedderburn.
Attorney

UNITED STATES PATENT OFFICE.

DAVID N. SIMONS, OF GRAND GORGE, NEW YORK.

PLANT-PROTECTOR.

SPECIFICATION forming part of Letters Patent No. 598,821, dated February 8, 1898.

Application filed May 25, 1897. Serial No. 638,046. (No model.)

*To all whom it may concern:*

Be it known that I, DAVID N. SIMONS, of Grand Gorge, in the county of Delaware and State of New York, have invented certain new and useful Improvements in Plant-Protectors; and I do hereby declare the following to be a full, clear, and exact description of the invention, such as will enable others skilled in the art to which it appertains to make and use the same.

My invention relates to improvements in plant-shades.

The object of the invention is to protect young plants from hot-beds or frames from the excessive heat of the sun when they are transplanted to the field or garden and also to protect them against cold winds and frost. Heretofore this has been done by using loose paper and other like fabrics to cover the plant temporarily.

My invention consists in the combination of a staff provided with a shoulder or head and a shade similar to that of a lamp-shade, the combination in use operating to cover and shade a plant, the shade part being held in position by means of the staff or stake thrust into the ground alongside the plants a sufficient distance to hold the shade firmly even against high wind.

Figure 1:
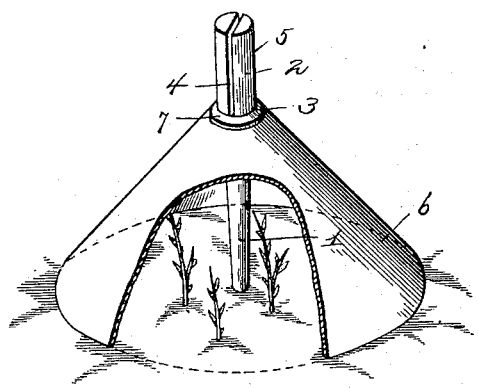
Figure 2:
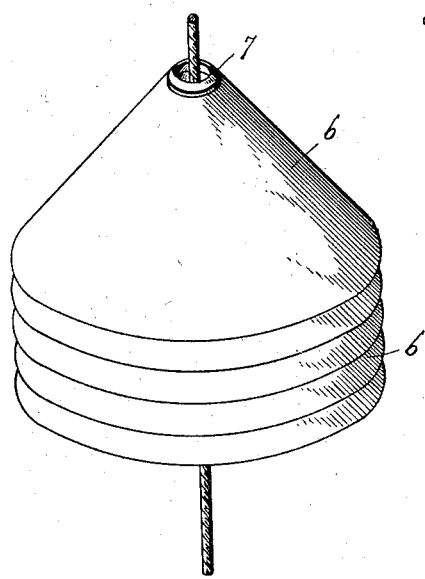
Figure 3:
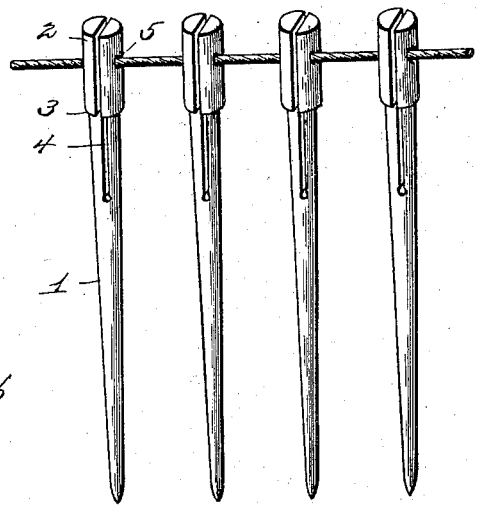

In the drawings forming a part of my specification, Figure 1 is a perspective showing my invention in use, a part of the shade being broken away to show the plant beneath it. Fig. 2 shows a nest of shades strung on a cord, and Fig. 3 shows a number of staffs or stakes suspended by a cord.

The staff or stake 1 is made tapering to or approximating a point at its lower end and is formed at its upper end with a head 2, the said head forming a shoulder 3 for a purpose which will hereinafter appear. An elongated longitudinally-extending slot 4 is formed in the upper end of the staff 1, which slot leads down through the head 2 into the main tapering portion of said staff. The said head 2 is perforated, as shown at 5, so that it may be strung upon a cord for convenience of storage and for enabling a number of them to be carried from point to point.

The shade 6 is conical in shape and may be made of any suitable material which will retain its form, but is preferably made of waterproof substance of sufficient body to withstand winds of considerable force. This shade may be made of one piece or of a plurality of pieces of material and should be provided at the upper end of the cone with a metallic eyelet or bushing 7.

The opening in the eyelet 7 is slightly smaller than the upper end of the staff 1 just beneath the head 2, by which construction the shade 6 may be readily adjusted upon the staff, so that the lower end thereof may be located a short distance above the ground and so that when desired the shade may be held in contact with the ground when the staff is driven thereinto, when the shoulder 2 bears against the eyelet 7. The shade is applied by compressing the two parts of the head 2, inserting the pointed lower end of the staff through the eyelet 7, and afterward releasing the two parts of the head, when the upper end of the staff will spring outwardly, holding the shade by frictional engagement therewith. The staff should be long enough (say ten or twelve inches) to enter the ground from four to six inches in order to hold the shade firmly against high winds. Ordinarily the shade should be seven or eight inches in diameter at the bottom.

It will be observed that the shades themselves may be nested and hung or strung on a cord for storage when not in use and for convenience in moving or taking a quantity of them where they are to be used. It will also be noticed that the stakes or staffs can likewise be strung upon a cord to prevent their becoming separated and lost when not in use.

It is further remarked that shades of this character will be found quite durable and are capable of lasting for a number of years.

Having now described my invention, what I claim as new, and desire to secure by Letters Patent, is—

1. The combination of a conical shade having a perforation through its apex and a staff whose upper end fits closely in the perforated shade, and provided with a collar or shoulder for holding the shade firmly against the surface of the ground, substantially as described.

2. The combination of a perforated conical shade and tapering staff provided with an enlarged shouldered and perforated head, substantially as described.

3. The combination of a conical shade having a perforation through its apex and a staff having its upper end provided with an enlarged and shouldered head longitudinally slit to permit it to be compressed, adapting it to pass into said perforation and to engage the opposite walls thereof by its expansion, whereby the shade is adapted to be firmly held in any desired position either against the ground or above the surface thereof, substantially as described.

In testimony whereof I have signed this specification in the presence of two subscribing witnesses.

DAVID N. SIMONS.

Witnesses:
CHARLES HARLEY,
JOHN S. BURGHER.